United States Patent [19]

Kwak

[11] Patent Number: 5,274,411
[45] Date of Patent: Dec. 28, 1993

[54] SHUTTER RELEASE

[75] Inventor: Debby H. Kwak, Cerritos, Calif.

[73] Assignee: Eastman Kodak Company, Rochester, N.Y.

[21] Appl. No.: 895,756

[22] Filed: Jun. 9, 1992

[51] Int. Cl.⁵ .............................................. G03B 17/38
[52] U.S. Cl. .................................................. 354/266
[58] Field of Search ..................... 354/486, 266, 267.1, 354/268, 269, 195.1

[56] References Cited

U.S. PATENT DOCUMENTS

| 3,186,319 | 6/1965 | Hochstein | 354/266 |
| 4,313,660 | 2/1982 | Nakano et al. | 354/234.1 |
| 5,113,214 | 5/1992 | Nagata et al. | 354/195.1 X |

Primary Examiner—Michael L. Gellner
Assistant Examiner—Howard B. Blankenship
Attorney, Agent, or Firm—Roger A. Fields

[57] ABSTRACT

A shutter release is manually movable in opposite directions from an intermediate position to respective terminal positions to release a camera shutter to make an exposure. Thus, a user is provided two alternative ways to manually operate the shutter release rather than a single way.

2 Claims, 3 Drawing Sheets

SHUTTER RELEASE

CROSS-REFERENCE TO A RELATED APPLICATION

Reference is made to commonly assigned copending application Ser. No. 07/895,758 entitled CAMERA ASSEMBLY and filed Jun. 9, 1992 in the name of Debby Hyun-Jin Kwak.

BACKGROUND OF THE INVENTION

1. Field of the Invention

The invention relates generally to the field of photography, and in particular to a shutter release for a photographic camera.

2. Description of the Prior Art

A shutter release for a photographic camera is a control or device that releases the camera shutter to make an exposure. Typically, the shutter release is a press button which is mounted on the camera body to permit it to be depressed by one's forefinger. See, for example, U.S. Pat. No. 3,186,319, issued Jun. 1, 1965.

While the technique of manually depressing a shutter release to make an exposure works for most people, a few experience some difficulty.

SUMMARY OF THE INVENTION

A shutter release is manually movable in opposite directions from a normal or intermediate position to respective terminal positions to release a camera shutter to make an exposure. Thus, a user is provided two alternative ways to manually operate the shutter release rather than a single way.

DETAILED DESCRIPTION OF THE PREFERRED EMBODIMENT

The invention is disclosed as being embodied in a compact 35 mm camera. Because such photographic cameras have become well known, this description is directed in particular to camera elements forming part of or cooperating directly with the preferred embodiment. It is to be understood, however, that camera elements not specifically shown or described may take various forms known to persons of ordinary skill in the art.

Figure 1:
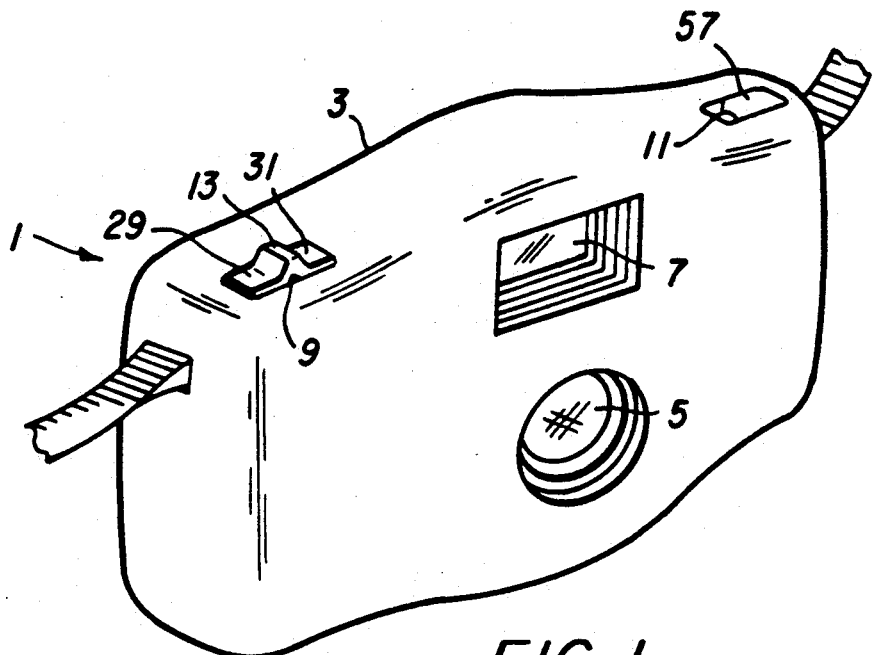
FIG. 1 is a top perspective view of a photographic camera.
Figure 2A:
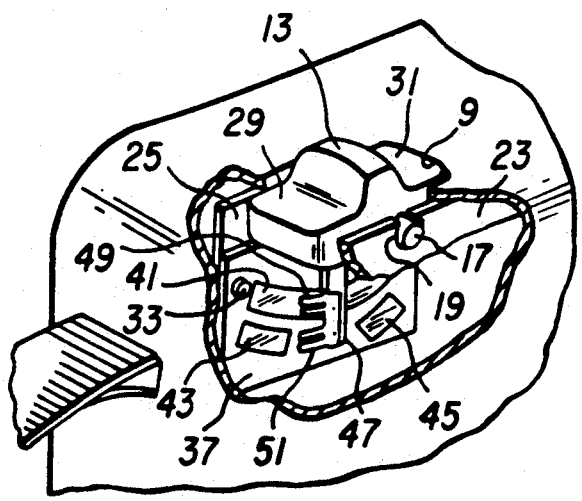
FIGS. 2A and 2B are front top perspective views of only parts of the camera body, showing a pair of right-hand and left-hand symmetric openings respectively, one of which is capped and the other of which has a bi-directional shutter release supported in it.
Figure 2B:
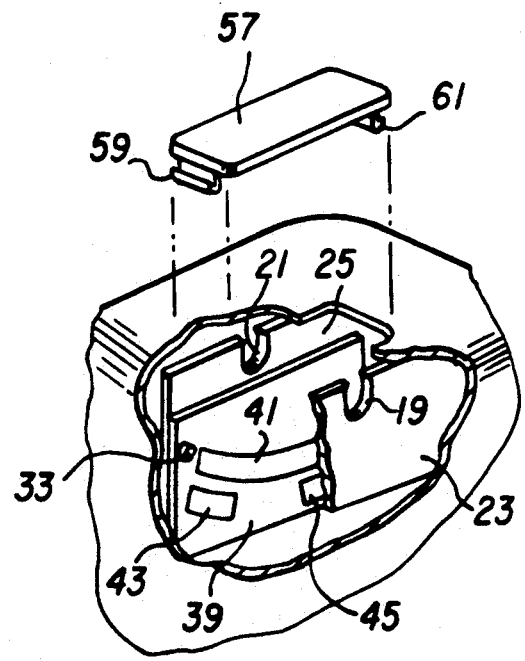
Figure 3:
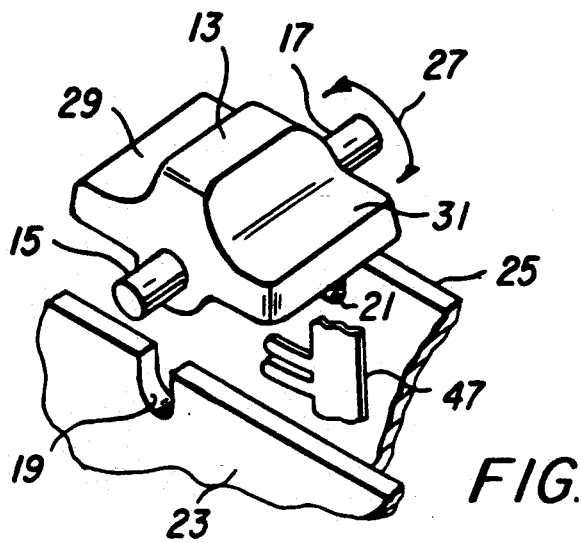
FIG. 3 is a detailed perspective view of the shutter release depicted in FIG. 2A.
Figure 4:
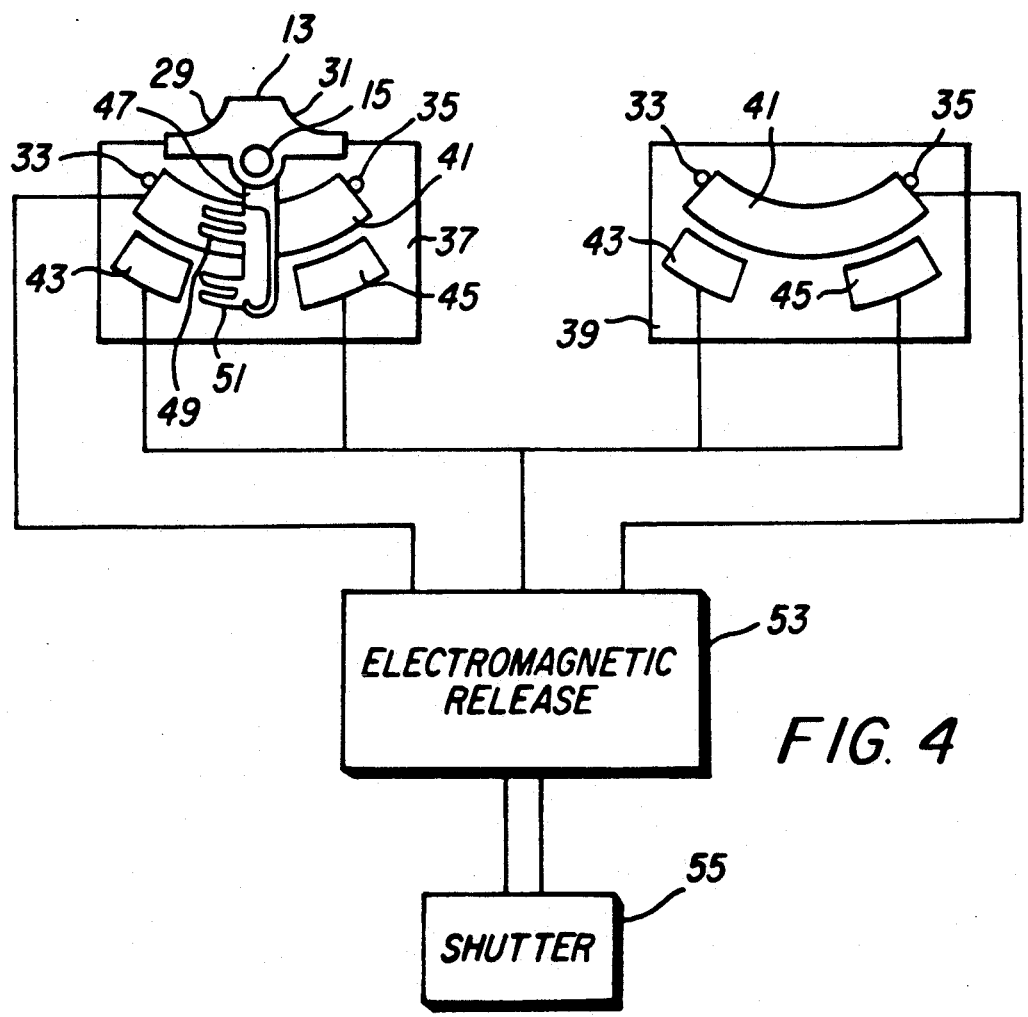
FIG. 4 is a schematic view of electrical circuitry to be used with the shutter release depicted in FIG. 2A.

Referring now to the drawings, FIG. 1 shows a photographic camera 1 comprising a camera body 3, a known taking lens 5, and a known viewfinder 7. As can be seen in FIGS. 2A and 2B, the camera body 3 has a pair of right-hand and left-hand symmetric openings 9 and 11 for alternatively receiving a manually actuatable shutter release in the form of a finger button 13. Preferably, the finger button 13 has two integrally formed coaxial pivot pins 15 and 17 centrally located with respect to opposite ends of the button. See FIG. 3. A pair of grooves 19 and 21 are formed in respective ribs 23 and 25 fixed within the camera body 3, proximate each of the right- and left-hand openings 9 and 11. The pivot pins 15 and 17 are snap-fitted into the grooves 19 and 21 at either one of the right- and left-hand openings 9 and 11 to support the finger button 13 for pivotal movement bi-directionally, i.e. in opposite directions as indicated by the double-headed arrow 27 in FIG. 3. A pair of symmetric surfaces 29 and 31 are formed on the finger button 13, to be manually gripped to pivot the button from an illustrated intermediate or non-operative position selectively to alternative terminal or operative positions against respective stops 33 and 35. The stops 33 and 35 protrude from identical switch bases 37 and 39 secured to the camera body 3 inwardly of the right- and left-hand openings 9 and 11. See FIGS. 2 and 4. A return spring, not shown, may be provided to bias the finger button 13 to its intermediate position from either one of its terminal positions.

Each of the switch bases 37 and 39 supports a single metallic-ribbon contact 41 and a pair of spaced metallic-ribbon contacts 43 and 45. An arm 47 projecting from the finger button 13 includes a metallic brush 49 that is continuously in engagement with the single contact 41 and a metallic brush 51 that is moved into engagement with the contact 43 or 45 in accordance with whichever one of the terminal positions the button is pivoted to from its intermediate position. The two brushes 49 and 51 are integrally formed. The contacts 41, 43 and 45 are connected to a known electromagnetic release 53 for a known camera shutter 55. When the finger button 13 is pivoted to either one of its terminal positions, the contacts 41 and 43 or the contacts 41 and 45 are electrically connected via the brushes 49 and 51 to cause the electromagnetic release 53 to be activated to, in turn, momentarily open the camera shutter 55 to make an exposure.

A cap 57 has two prongs 59 and 61 that secure the cap to the camera body 3, over whichever one of the right- and left-hand openings 9 and 11 that does not include the finger button 13. See FIGS. 1 and 2A.

Figure 5:
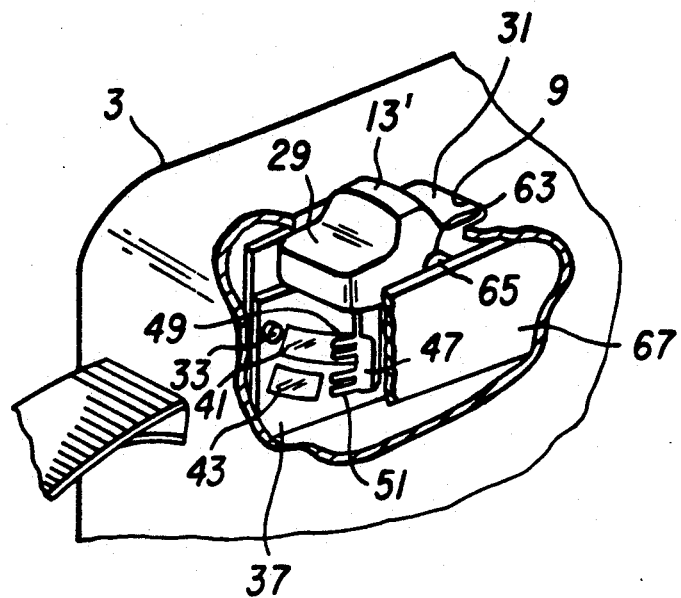
FIG. 5 is a front top perspective view of only part of the camera body, showing a shutter release which is an alternate version of the one depicted in FIG. 2A.
Figure 6:
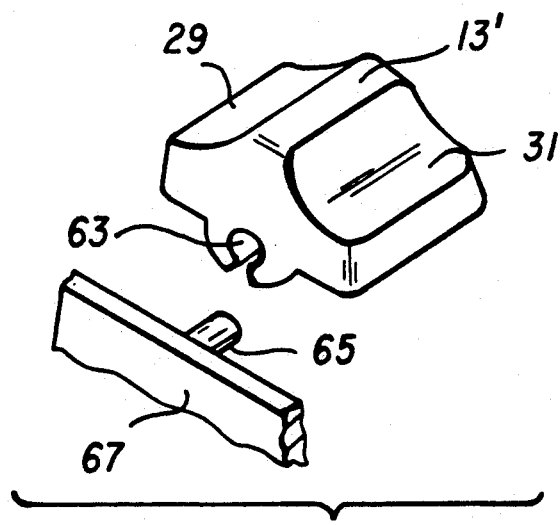
FIG. 6 is a detailed perspective view of the shutter release depicted in FIG. 5.

FIGS. 5 and 6 show a variation 13' of the finger button 13. In lieu of the coaxial pivot pins 15 and 17, the variation 13' has a coaxial hole 63 for receiving two aligned pins 65, only one shows, that project from respective ribs 67 and 69 similar to the ribs 23 and 25.

The invention has been described with reference to a preferred embodiment. However, it will be appreciated that various modifications can be effected within the ordinary skill in the art without departing from the scope of the invention.

I claim:

1. An improved camera apparatus wherein a shutter release is mounted for movement to release a shutter mechanism to make an exposure, and wherein the improvement comprises:

means supporting said shutter release for manual movement in opposite directions from an intermediate position to respective terminal positions; and means for releasing said shutter mechanism to make an exposure responsive to manual movement of said shutter release to either one of its terminal positions, whereby a user is provided two alternative ways to manually operate said shutter release rather than a single way.

2. An improved camera apparatus as recited in claim 1, wherein said releasing means includes an electrical switch having two fixed spaced contacts and a single movable contact connected to said shutter release for movement between said fixed contacts to touch either one of the fixed contacts in accordance with manual movement of the shutter release to either one of its terminal positions.

* * * * *